(12) United States Patent
Wang et al.

(10) Patent No.: US 11,472,471 B2
(45) Date of Patent: Oct. 18, 2022

(54) DIFFERENTIAL COOPERATIVE ACTIVE STEERING FOR A FRONT-AXLE INDEPENDENT-DRIVE VEHICLE WITH ELECTRIC WHEELS AND CONTROL METHOD THEREFOR

(71) Applicant: JILIN UNIVERSITY, Jilin (CN)

(72) Inventors: Junnian Wang, Jilin (CN); Dedong Guo, Jilin (CN); Shoulin Gao, Jilin (CN); Zheng Luo, Jilin (CN)

(73) Assignee: JILIN UNIVERSITY, Changchun (CN)

( * ) Notice: Subject to any disclaimer, the term of this patent is extended or adjusted under 35 U.S.C. 154(b) by 56 days.

(21) Appl. No.: 17/110,549

(22) Filed: Dec. 3, 2020

(65) Prior Publication Data
US 2021/0171093 A1 Jun. 10, 2021

(51) Int. Cl.
*B62D 5/04* (2006.01)
*B62D 6/00* (2006.01)
*B62D 15/02* (2006.01)

(52) U.S. Cl.
CPC ......... *B62D 5/0463* (2013.01); *B62D 5/0418* (2013.01); *B62D 5/0466* (2013.01); *B62D 6/00* (2013.01); *B62D 15/025* (2013.01)

(58) Field of Classification Search
CPC .. B62D 5/0463; B62D 5/0418; B62D 5/0466; B62D 6/00; B62D 15/025; B62D 5/008; B62D 6/002; B62D 9/002; B62D 11/04; B62D 15/02

USPC .......................................................... 701/41
See application file for complete search history.

(56) References Cited

U.S. PATENT DOCUMENTS

2009/0009305 A1 * 1/2009 Kataoka ................. G08G 1/167
340/439

FOREIGN PATENT DOCUMENTS

| CN | 106080753 A | | 11/2016 | |
| CN | 107042841 A | * | 8/2017 | ............... B62D 5/00 |
| CN | 107042841 A | | 8/2017 | |
| CN | 108163044 A | | 6/2018 | |
| CN | 108275200 A | * | 7/2018 | |
| CN | 108275200 A | | 7/2018 | |
| CN | 108791488 A | * | 11/2018 | ............. B62D 11/04 |
| CN | 108791488 A | | 11/2018 | |

* cited by examiner

*Primary Examiner* — Scott A Reinbold

(57) ABSTRACT

A differential cooperative active steering system for a front-axle independent-drive vehicle with electric wheels includes a steering rack which is arranged between a first steering wheel and a second steering wheel, and is able to generate lateral displacement and pull the first and second steering wheels to steer; a planetary gear mechanism, including a first input end, a second input end and an output end; a steering angle coupling motor, connected to the first input end; and an input shaft of the steering wheel, connected to the second input end. The planetary gear mechanism can realize the coupling between an input steering angle of an input shaft of the steering wheel and an input steering angle of the steering angle coupling motor. In addition, a method for controlling the differential cooperative active steering system is provided.

6 Claims, 11 Drawing Sheets

DIFFERENTIAL COOPERATIVE ACTIVE STEERING FOR A FRONT-AXLE INDEPENDENT-DRIVE VEHICLE WITH ELECTRIC WHEELS AND CONTROL METHOD THEREFOR

CROSS-REFERENCE TO RELATED APPLICATIONS

This application claims the benefit of priority from Chinese Patent Application No. 201911238318.2, filed on Dec. 6, 2019. The content of the aforementioned application, including any intervening amendments thereto, is incorporated herein by reference in its entirety.

TECHNICAL FIELD

The present application relates to electric vehicle steering, and more particularly to a differential cooperative active steering system for a front-axle independent-drive vehicle with electric wheels and a control method therefor.

BACKGROUND

Currently, electrification becomes a trend in the automotive industry to overcome environmental problems and energy crisis, and electric-wheel-independent-drive vehicles have attracted more and more attention due to their advantages. In particular, since the torque of each drive wheel of the electric-wheel-drive vehicle is independently controllable, a novel steering assist technology, differential-drive-assist-steering (DDAS), can be applied to the electric-wheel-drive vehicle, in which the drive assist steering is achieved by applying different drive torques to the drive wheels on both sides of the front axle to offset the steering resistance torque. Like electric power steering (EPS), DDAS can achieve speed-based assist steering without a steering assist mechanism, thereby making the steering system more compact and flexible in layout. In addition, the controller of the differential-drive-assist-steering system can be integrated on the vehicle controller, thereby improving the integration and reliability of the system.

At the same time, in order to overcome the contradiction between the characteristics "light" and "sensitive" in the steering system, and improve the flexibility of low-speed steering and the stability of high-speed steering, active front-wheel steering (AFS) that can realize variable steering ratio emerges. Currently, many companies have launched AFS systems with the same principles. For example, Bayerische Motoren Werke AG and ZF Friedrichshafen AG have jointly developed the AFS system with 2K-H planetary gear mechanism as the core, and Audi AG has launched the dynamic steering system with harmonic gear as the core. However, the AFS system will interfere with the DDAS system. On the one hand, the additional steering angle intervention imposed by the AFS system will cause the steering angle of the front wheel to change, and there is an approximately linear relationship between the steering torque and the steering angle of the front wheel within a certain range of the steering angle. Therefore, the intervention of the AFS system will cause instantaneous fluctuations in steering wheel torque, which is not conducive to safe driving. On the other hand, a reference steering wheel torque is obtained according to the speed of the vehicle and the steering angle of the steering wheel, so as to directly control the steering wheel torque in the DDAS system. Since the steering angle of the steering wheel does not change when the AFS system intervenes, the reference steering wheel torque is the same as that before the intervention of the AFS system. Therefore, the steady-state value of the steering wheel torque is the same as that before the intervention of the AFS system, so the driver is unable to correctly perceive the current road information and the driving state of the vehicle.

In addition, there is a prominent problem when the AFS system is equipped on a vehicle with the DDAS system. When the DDAS system achieves a steering assistance through a drive torque difference between both sides of the front axle, an additional yaw moment around the center of mass of the vehicle is introduced. The yaw moment will change the steady-state yaw rate gain of the vehicle, i.e., the yaw rate gain of the steering angle of the steering wheel determined by the ideal angle transmission ratio of the steering wheel in the AFS control system, further affecting the dynamic characteristics of the steering system.

SUMMARY

The present disclosure provides a differential cooperative active steering system for an front-axle independent-drive vehicle with electric wheels, in which a planetary gear mechanism is provided to realize the coupling between an input steering angle of an input shaft of a steering wheel and an input steering angle of a steering angle coupling motor, thereby achieving active steering of the vehicle. Two same independent wheel drive systems are provided to drive the vehicle and provide steering assistance, which further makes the steering system more portable and flexible.

The present disclosure further provides a method for controlling a differential cooperative active steering system for an front-axle independent-drive vehicle with electric wheels, in which an influence of the differential-drive-assist-steering on the steering gain characteristics of the active steering system can be effectively suppressed by revising original control strategies of the AFS system and the DDAS system, so that the vehicle can better maintain the ideal steering characteristics, and effectively weaken the momentary fluctuation of the steering wheel torque controlled by the differential-drive-assist-steering system caused by the intervention of the steering system. This ensures that the driver can perceive the correct road information.

In a first aspect, the present disclosure provides a differential cooperative active steering system for an front-axle independent-drive vehicle with electric wheels, comprising:

a steering rack, arranged between a first steering wheel and a second steering wheel, for generating lateral displacement to pull the first steering wheel and the second steering wheel to steer;

a planetary gear mechanism, comprising: a first input end, a second input end and an output end, wherein the output end is connected to the steering rack and drives the steering rack to generate lateral displacement;

a steering angle coupling motor, wherein an output shaft of the steering angle coupling motor is connected to the first input end of the planetary gear mechanism;

an input shaft of the steering wheel, connected to the second input end;

wherein the planetary gear mechanism realizes coupling between an input steering angle of the input shaft of the steering wheel and an input steering angle of the steering angle coupling motor;

a first wheel independent drive system, comprising:

a first support shaft;

a first steering knuckle, detachably arranged at one end of the first support shaft, wherein one end of the first steering knuckle is connected to the steering rack, and the other end of the first steering knuckle is fixed on a first suspension;

a first stator, fixedly arranged on the first support shaft;

a first winding, arranged on the first stator;

a first permanent magnet, arranged on a first rotor; and the first rotor, rotatably arranged on the first support shaft and detachably connected to a rim of a first wheel to drive the first wheel to rotate; and a second wheel independent drive system, comprising:

a second support shaft;

a second steering knuckle, detachably arranged at one end of the second support shaft of the second hub motor, one end of the second steering knuckle is connected to the steering rack, and the other end of the second steering knuckle is fixed on a second suspension;

a second stator, fixedly arranged on the second support shaft;

a second winding, arranged on the second stator;

a second permanent magnet, arranged on a second rotor; and the second rotor, rotatably sleeved on the second support shaft and detachably connected to a rim of a second wheel to drive the second wheel to rotate.

In an embodiment, the steering system further comprises a steering control mechanism, comprising:

a steering shaft, wherein one end of the steering shaft is connected to the steering wheel and the steering shaft is able to receive a steering power of the steering wheel; and a steering transmission shaft, one end of the steering transmission shaft is connected to the other end of the steering shaft through a first universal joint, and the other end is connected to the steering wheel input shaft through a second universal joint;

wherein, a length of the steering transmission shaft is adjustable.

In a second aspect, the present disclosure further provides a method for controlling a differential cooperative active steering system for a front-axle independent-drive vehicle with electric wheels, comprising:

(1) collecting a steering angle signal and a torque signal of a steering wheel, and determining a driving state of a vehicle according to the steering angle signal and the torque signal; wherein, the driving state comprises a steering state, a return-to-center state and a straight-running state;

(2) calculating an output steering angle of a steering angle coupling motor and a drive torque difference of two driving wheels when the vehicle is in the steering state;

calculating the output steering angle signal of the steering angle coupling motor and the drive torque difference of the two driving wheels when the vehicle is in the return-to-center state; and (3) respectively sending the output steering angle of the steering angle coupling motor and a torque signal of a hub motor of an inner driving wheel and a torque signal of a hub motor of an outer driving wheel to a controller of the steering angle coupling motor and two hub motor controllers, so as to control a steering system.

In an embodiment, the step of determining a driving state of the vehicle according to the steering angle and the torque in step 1 comprises:

comparing the torque of the steering wheel with an assist threshold, and calculating a product of the steering angle and an angular velocity of the steering wheel;

if the torque of the steering wheel is not less than the assist threshold or the product of the torque of the steering wheel and the assist threshold is not negative, setting a time value to 0, and determining that the vehicle is in the steering state;

if the torque of the steering wheel is not less than the assist threshold and the product of the torque of the steering wheel and the assist threshold is negative, starting timing and comparing the time value with a time threshold value; if the time value is greater than the time threshold value, determining that the vehicle is in the return-to-center state.

In an embodiment, the step of calculating an output steering angle of a steering angle coupling motor when the vehicle is in the steering state in step 2 comprises:

a) collecting a vehicle velocity, the steering angle of the steering wheel and a yaw rate, and based on the vehicle velocity and the steering angle of the steering wheel, obtaining an ideal transmission ratio under a current working condition by reading a MAP of ideal transmission ratio;

b) calculating a theoretical value of the steering angle of the steering angle coupling motor according to the ideal transmission ratio and the steering angle signal of the steering wheel, wherein the calculation formula is:

$$\delta_{ac}^* = \left(1 - \frac{i_{13}^H \cdot i_{ws}}{i_d}\right) \frac{i_M}{1 - i_{13}^H} \cdot \delta_h;$$

wherein $\delta_{ac}^*$ is the theoretical value of the steering angle of the steering angle coupling motor; $i_{13}^H$ is a transmission ratio from an input end to an output end when a planetary frame of a planetary gear mechanism is fixed; $i_{ws}$ is a transmission ratio of a steering gear; $i_M$ is a transmission ratio of a reduction mechanism of the steering angle coupling motor; $i_d$ is the ideal transmission ratio; and $\delta_h$ is the steering angle signal of the steering wheel;

c) calculating a difference between an actual yaw rate and a reference yaw rate as follows:

$$e_\omega = \omega_r \omega_r^*;$$

wherein $e_\omega$ is the difference between the actual yaw rate and the reference yaw rate; $\omega_r$ is the actual yaw rate; $\omega_r^*$ is the reference yaw rate;

$$\omega_r^* = \frac{V}{L} \cdot \frac{\delta_h}{i_d};$$

V is a vehicle velocity signal; L is a wheelbase of the vehicle; $\delta_h$ is the steering angle signal of the steering wheel; and $i_d$ is the ideal transmission ratio;

d) calculating a steering angle correction $\Delta\delta_{ac}$ of the steering angle coupling motor by inputting the difference between the actual yaw rate and the reference yaw rate into a PID controller; and e) calculating the output steering angle of the steering angle coupling motor as follows:

$$\delta_{ac} = \delta_{ac}^* + \Delta\delta_{ac};$$

wherein $\delta_{ac}$ is the output steering angle of the steering angle coupling motor; $\delta_{ac}^*$ is the theoretical value of the steering angle of the steering angle coupling motor; $\Delta\delta_{ac}$ is the steering angle correction of the steering angle coupling motor.

In an embodiment, the step of calculating the drive torque difference of two driving wheels when the vehicle is in the steering state in step 2 comprises:

2.1) calculating a steering angle of a pinion according to the steering angle of the steering wheel and the steering angle of the steering angle coupling motor:

$$\delta_p = \frac{1}{i_{13}^H} \cdot \delta_h + \left(1 - \frac{1}{i_{13}^H}\right)\frac{1}{i_M} \cdot \delta_{ac};$$

wherein $\delta_p$ is the steering angle signal of the pinion; $\delta_h$ is the steering angle signal of the steering wheel; $i_{13}^H$ is the transmission ratio from the input end to the output end when the planetary frame of the planetary gear mechanism is fixed; $i_M$ is the transmission ratio of the reduction mechanism of the steering angle coupling motor; and $\delta_{ac}$ is the steering angle of the steering angle coupling motor.

2.2) calculating a corrected reference torque of the steering wheel:

$$T_d^* = T_{d1}^* + k_1(T_{d2}^* - T_{d1}^*);$$

wherein $T_d^*$ is the corrected reference torque of the steering wheel; $T_{d1}^*$ is an original reference torque signal of the steering wheel and is obtained by reading a MAP of the torque of the steering wheel according to the vehicle velocity and the steering angle of the steering wheel; $k_1$ is a perception coefficient; $T_{d2}^*$ is an equivalent reference torque of the steering wheel and is obtained by reading the MAP of the torque of the steering wheel according to the vehicle velocity signal and the steering angle of the pinion;

2.3) calculating a difference between the actual torque of the steering wheel and the corrected reference torque of the steering wheel as follows:

$$e_T = T_d - T_d^*;$$

wherein $e_T$ is the difference between the actual torque of the steering wheel and the corrected reference torque of the steering wheel; $T_d$ is the actual torque of the steering wheel; $T_d^*$ is the corrected reference torque of the steering wheel;

2.4) calculating a corrected drive torque difference $\Delta T_1$ of the two driving wheels by inputting the difference between the actual torque of the steering wheel and the corrected reference torque of the steering wheel into the PID controller, and calculating a drive torque difference $\Delta T_2$ of the two driving wheels according to a differential of the torque of the steering wheel; and 2.5) calculating the drive torque difference of the two driving wheels when the vehicle is in the steering state:

$$\Delta T = \Delta T_1 + \Delta T_2;$$

wherein $\Delta T$ is the drive torque difference when the vehicle is in the steering state.

In an embodiment, the step of calculating the output steering angle of the steering angle coupling motor when the vehicle is in the return-to-center state in step 2 comprises:

obtaining the steering angle signal of the steering wheel and the steering angle of the steering angle coupling motor; and calculating the steering angle of the steering angle coupling motor when the vehicle is in the return-to-center state:

$$\delta_{ac}^h = \delta_{ac0} - \int \frac{\delta_{ac}}{\delta_h} \cdot \delta_h dt;$$

wherein $\delta_{ac}^h$ is the steering angle signal of the steering angle coupling motor when the vehicle is in the return-to-center state; $\delta_{ac0}$ is the steering angle signal of the steering angle coupling motor when the vehicle starts to return; $\delta_h$ is the steering angle of the steering wheel.

In an embodiment, the drive torque difference of the two driving wheels when the vehicle is in the return-to-center state in step 2 is:

$$\Delta T^H = \begin{cases} K_p \delta_h + K_d \frac{d\delta_h}{dt} & |\delta_h| > 20° \\ K_p \delta_h + K_i \int \delta_h dt + K_d \frac{d\delta_h}{dt} & |\delta_h| \leq 20° \end{cases};$$

wherein $\Delta T^H$ is the drive torque difference of the two driving wheels when the vehicle is in the return-to-center state; $\delta_h$ is the steering angle of the steering wheel; $K_p$, $K_i$, $K_d$ are respectively a proportional coefficient, an integral coefficient and a derivative coefficient of the PID controller.

In an embodiment, the step of respectively sending the output steering angle of the steering angle coupling motor and the torque of the hub motor of the inner driving wheel and the torque of the hub motor of the outer driving wheel to the controller of the steering angle coupling motor and the two hub motor controllers in step 3 comprises:

calculating the torque of the hub motor of the inner driving wheel and the torque of the hub motor of the outer driving wheel:

$$T_i = \frac{1}{2}(T_{dri} - \Delta T);$$

$$T_o = \frac{1}{2}(T_{dri} + \Delta T);$$

wherein $T_i$ is the torque of the hub motor of the inner driving wheel; $T_o$ is the torque of the hub motor of the outer driving wheel; $T_{dri}$ is a total drive torque; and $\Delta T$ is the drive torque difference of the two driving wheels when the vehicle is in the steering state or return-to-center state;

calculating a slip rate of the outer driving wheel:

$$s = \frac{r\omega - u_w}{r\omega};$$

wherein $u_w$ is a velocity of a wheel center; r is a rolling radius of a wheel; and $\omega$ is an angular velocity of the wheel;

comparing the slip rate of the outer driving wheel with a slip rate threshold of the outer driving wheel; if the slip rate of the outer driving wheel is not greater than the slip rate threshold of the outer driving wheel, outputting the torque of the hub motor of the inner driving wheel and the torque of the hub motor of the outer driving wheel to the two hub motor controllers, so as to control the steering system;

if the slip rate of the outer driving wheel is greater than the slip rate threshold of the outer driving wheel, inputting a difference between the slip rate of the outer driving wheel and the slip rate threshold into the PID controller to obtain a correction $T_c$ of a differential torque;

recalculating the torque of the hub motor of the inner driving wheel:

$$T_i' = T_i + T_c; \text{ and}$$

recalculating the torque of the hub motor of the outer driving wheel:

$$T_o' = T_o - T_c;$$

wherein $T_i'$ is a recalculated torque of the hub motor of the inner driving wheel; $T_o'$ is a recalculated torque of the hub motor of the inner driving wheel; $T_i$ is the torque signal of the hub motor of the outer driving wheel and $T_o$ is the torque signal of the hub motor of the outer driving wheel; and recalculating the slip rate of the outer driving wheel; and comparing the slip rate of the outer driving wheel with the slip rate threshold of the outer driving wheel; if the slip rate of the outer driving wheel is not greater than the slip rate threshold, outputting the recalculated torque of the hub motor of the inner driving wheel and the recalculated torque of the hub motor of the outer driving wheel to the two hub motor controllers, so as to control the steering system.

Compared to the prior art, the present invention has following beneficial effects.

(1) The differential cooperative active steering system of the present invention can ensure that the front wheels return to a center position with the steering wheel simultaneously, which is quick and accurate.

(2) The differential cooperative active steering system can automatically determine whether the vehicle is in a steering state or return-to-center state.

(3) Mutual interference between the AFS system and the DDAS system is reduced by correcting the original control strategies of the two subsystems. On the one hand, the coupling motor steering angle in the AFS system is corrected through the yaw rate feedback control, to reduce an influence of the DDAS system on the original steering characteristics of the vehicle. On the other hand, the reference steering wheel torque of the DDAS system is corrected according to the superimposed steering angle of the AFS system to ensure that the driver can perceive the correct road surface information, and the steering wheel torque differential control is adopted to weaken the instantaneous fluctuation of the steering wheel torque when the AFS system intervenes.

DETAILED DESCRIPTION OF EMBODIMENTS

The present disclosure will be further described in detail in conjunction with the accompanying drawings, from which the technical solutions will be clearer.

Figure 1:
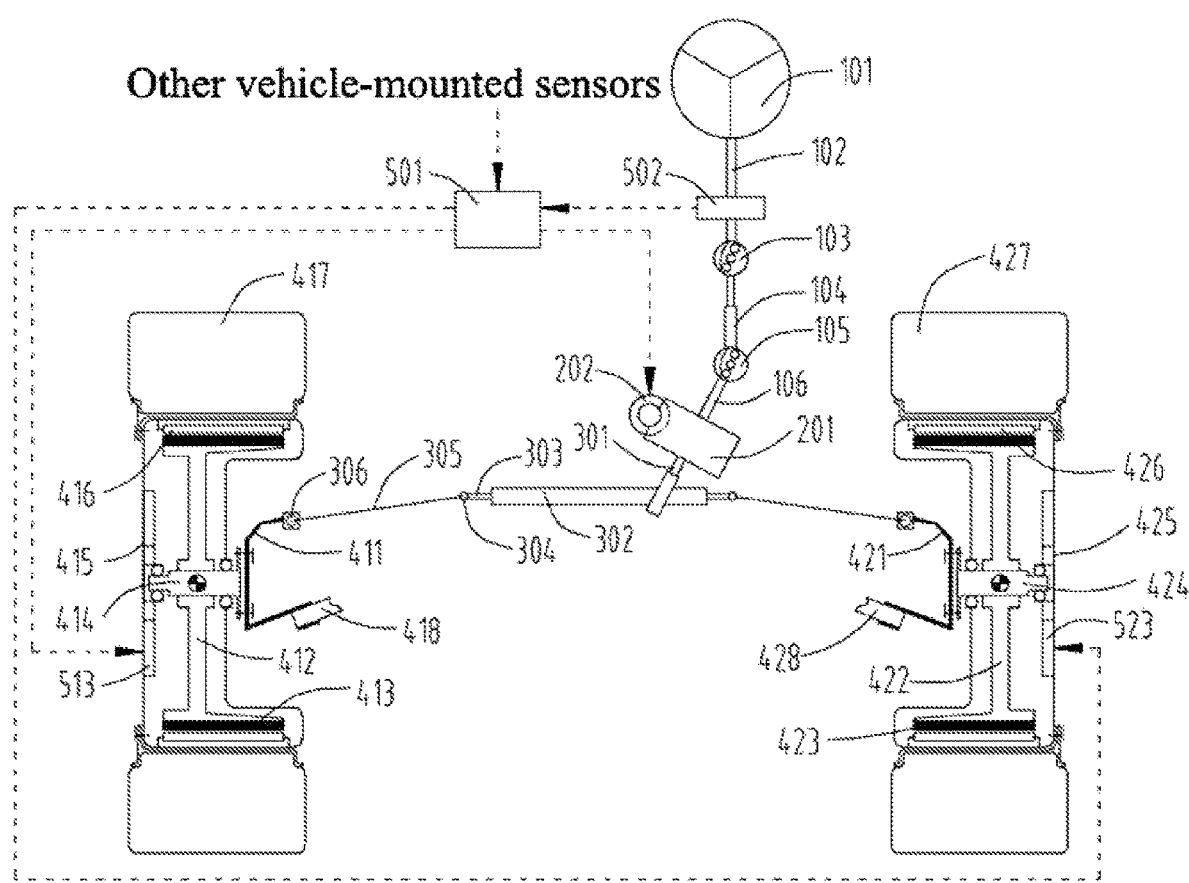
FIG. 1 is a schematic diagram of a differential cooperative active steering system for a front-axle independent-drive vehicle with electric wheels according to an embodiment of the present disclosure.
Figure 2:
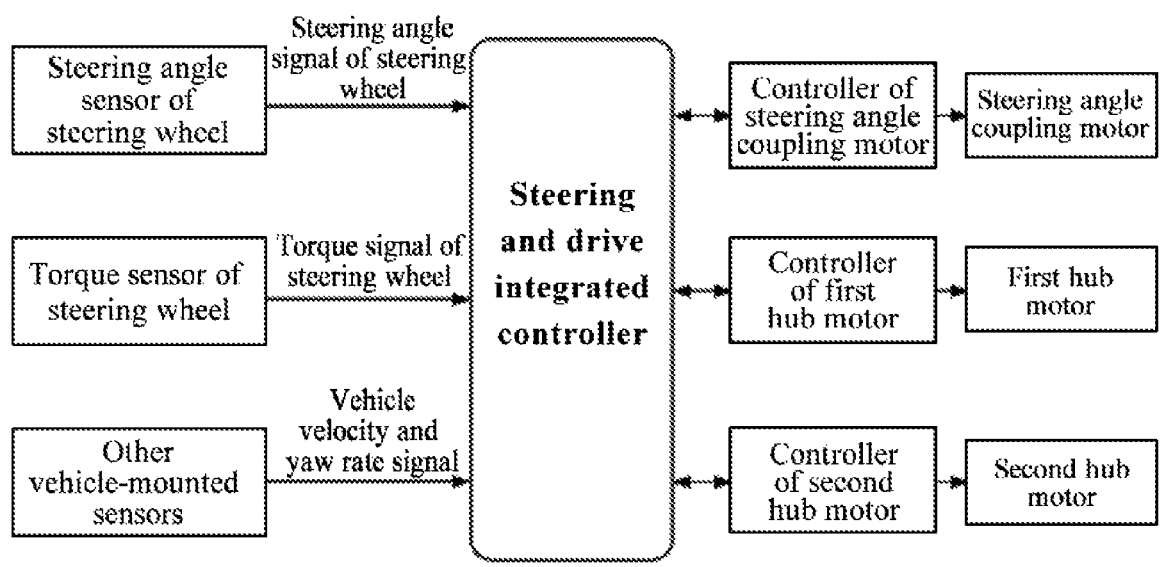
FIG. 2 is a schematic diagram showing an electrical connection relationship of the differential cooperative active steering system for the front-axle independent-drive vehicle with electric wheels according to an embodiment of the present disclosure.

Referring to FIG. 1, the embodiment provides a differential cooperative active steering system for a front-axle independent-drive vehicle with electric wheels, including a steering control mechanism, a steering angle coupling mechanism, a steering gear and steering transmission mechanism, an independent wheel drive system, a signal acquisition device, a steering and drive integrated controller 501 and a CAN bus, where the steering and drive integrated controller 501 is connected to a steering angle and torque sensor 502 of a steering wheel through an analog signal line, and connected to other on-board sensors, a controller of a coupling motor 202, and a first hub motor controller 513 and a second hub motor controller 523 through the CAN bus, thereby achieving the steering and driving control of the vehicle.

The steering control mechanism includes a steering wheel 101, a steering shaft 102, a first universal joint 103, a steering transmission shaft 104, a second universal joint 105 and an input shaft 106 of the steering wheel 101. The steering wheel 101 can be a three-spoke wheel or four-spoke steering wheel. An upper end of the steering shaft 102 is connected to the steering wheel 101 through a spline. The steering transmission shaft 104 consists of a casing with an internal spline and a shaft with an external spline, and the shaft is inserted in the casing, so that a length of the transmission shaft 104 can be adjusted by the relative sliding between the casing and the shaft. An upper end of the steering transmission shaft 104 is connected to the steering shaft 102 through the first universal joint 103, and a lower end thereof is connected to the input shaft 106 of the steering wheel through the second universal joint 105. The combination of the first universal joint 103, the second universal joint 105 and the steering drive shaft 104 can meet the overall arrangement requirements of different vehicles.

As shown in FIG. 1, the steering angle coupling mechanism includes a 2-DOF planetary gear mechanism 201 and a steering angle coupling motor 202. The planetary gear mechanism 201 and a casing of the steering angle coupling motor 202 are fixed on a vehicle body. The planetary gear mechanism 201 has two independent input ends and a common output end, where the two input ends are respectively connected to the input shaft 106 of the steering wheel and the angle coupling motor 202, and the output end is connected to a pinion 301 of the steering gear. The planetary gear mechanism 201 can realize the coupling between an input steering angle of the steering wheel 101 and an input steering angle of the steering angle coupling motor 202. The steering angle coupling motor 202 is controlled to provide an additional steering angle to the pinion 301 of the steering gear, so as to achieve an active steering of the vehicle.

The steering gear and steering transmission mechanism includes the pinion 301 of the steering gear, a casing 302 of the steering gear, a steering rack 303, two tie rod ball pins 304, two tie rods 305 and two steering knuckle arm ball pins 306 with the same structure. The casing 302 of the steering gear is fixed to the vehicle body. An upper end of the pinion 301 of the steering gear is in splined connection with an output end of the planetary gear mechanism 201, and a lower end thereof is meshed with the steering rack 303. Two ends of the steering rack 303 are respectively articulated with the two tie rods 305 through the two tie rod ball pins 304, and the two tie rods 305 are articulated with a steering knuckle 411 of a first wheel and a second steering knuckle 421 of a second wheel through the two steering knuckle arm ball pins 306, respectively. The horizontal movement of the steering rack 303 is converted into the steering of the steering knuckle through the two steering tie rods to realize wheel steering.

As shown in FIG. 1, the independent wheel drive system is driven by first and second external rotor hub motors. Specifically, the first external rotor hub motor includes a first steering knuckle 411, a first stator 412, a first winding 413, a first support shaft 414, a first rotor 415, a first permanent magnet 416, a first wheel 417, and a first suspension 418. The first knuckle 411 is connected to the first support shaft 414 through bolts. The first rotor 415 is supported on the first support shaft 414 through a bearing. The first stator 412 is fixedly connected to the first support shaft 414. The first wheel 417 is connected to a shell of the first rotor 415 through a rim bolt. The first winding 413 is mounted on the first stator 412. The first permanent magnet 416 is arranged on the first rotor 415. When the vehicle is running, the first rotor is a rotating part and drives the first wheel to rotate through the rim bolt. The first support shaft and the first stator are fixed components, where the first support shaft is connected to the first suspension and remains relatively stationary with the first suspension, thereby realizing the running of the vehicle.

Similarly, the second external rotor hub motor includes a second steering knuckle 421, a second stator 422, a second winding 423, a second support shaft 424, a second rotor 425, a second permanent magnet 426, a second wheel 427, and a second suspension 428. The second knuckle 421 is connected to the second support shaft 424 through bolts. The second rotor 425 is supported on the second support shaft 424 through a bearing. The second stator 422 is fixedly connected to the second support shaft 424. The second wheel 427 is connected to a shell of the second rotor 425 through a rim bolt. The second winding 423 is mounted on the second stator 422. The second permanent magnet 426 is arranged on the second rotor 425. When the vehicle is running, the second rotor is a rotating part and drives the second wheel to rotate through the rim bolt. The second support shaft and the second stator are fixed components, where the second support shaft is connected to the second suspension and remains relatively stationary with the second suspension, thereby realizing the running of the vehicle.

The independent wheel drive system of the present disclosure can realize independent driving of the wheels on both sides, and can provide steering assistance through the difference of the drive force of the first and second wheels.

As shown in FIGS. 2-11, the steering and drive integrated controller 501 not only controls output torques of the two hub motors to drive the vehicle for normal driving by connecting to the first hub motor controller 513 and the second hub motor controller 523 via the CAN bus, but also controls the steering angle coupling motor 202 to realize an active steering of the vehicle, thereby realizing a differential drive assisted steering of the first and second hub motors.

Figure 3:
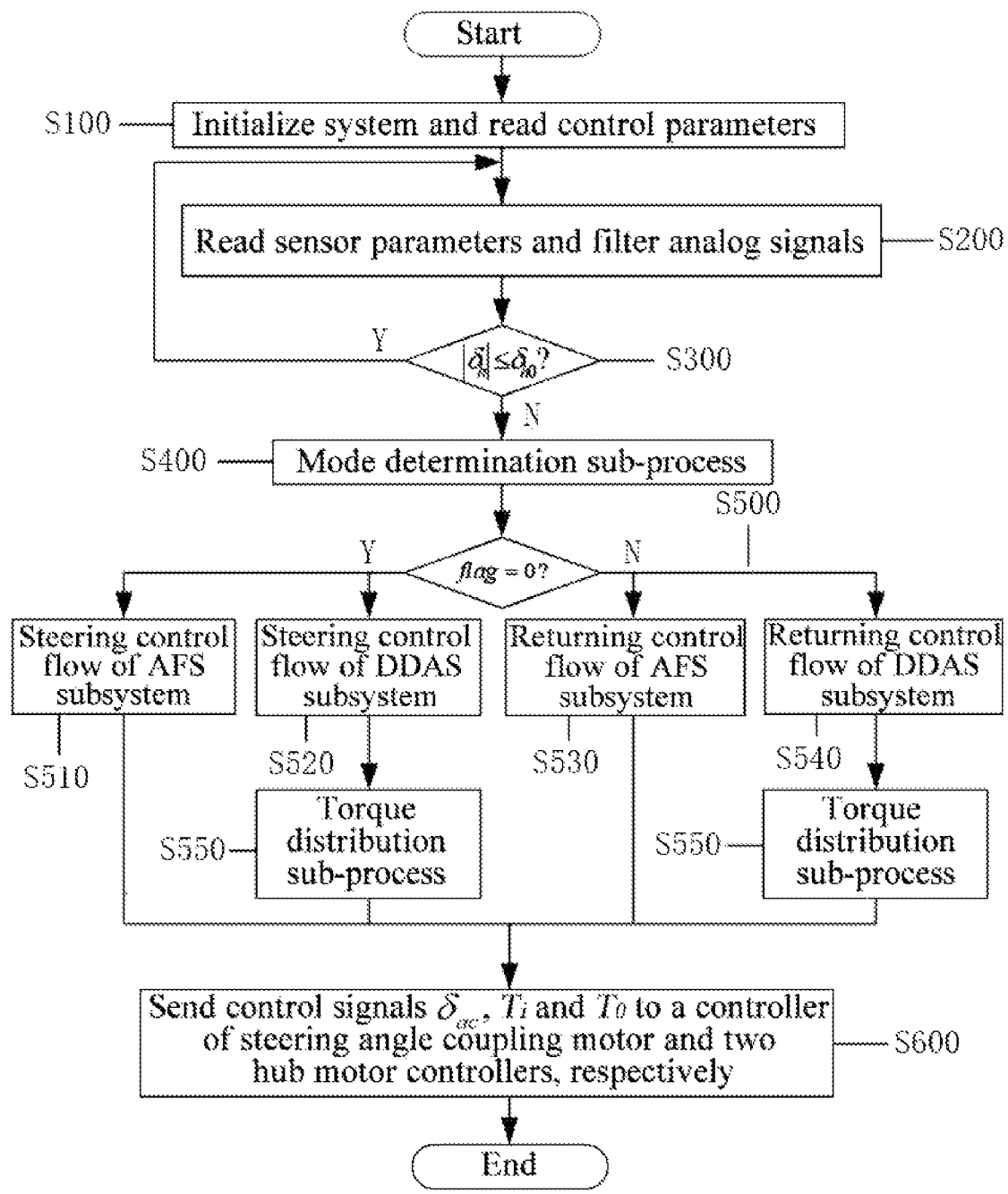
FIG. 3 is a main control flow chart of the differential cooperative active steering system for the front-axle independent-drive vehicle with electric wheels according to an embodiment of the present disclosure.

As shown in FIG. 3, the embodiment further provides a method for controlling the differential cooperative active steering system for the front-axle independent-drive vehicle with electric wheels, including the following steps.

S100: After powered on, the steering and drive integrated controller is initialized, and a self-check process is completed. The stored control parameters are read and mainly include the following parameters.

Figure 10:
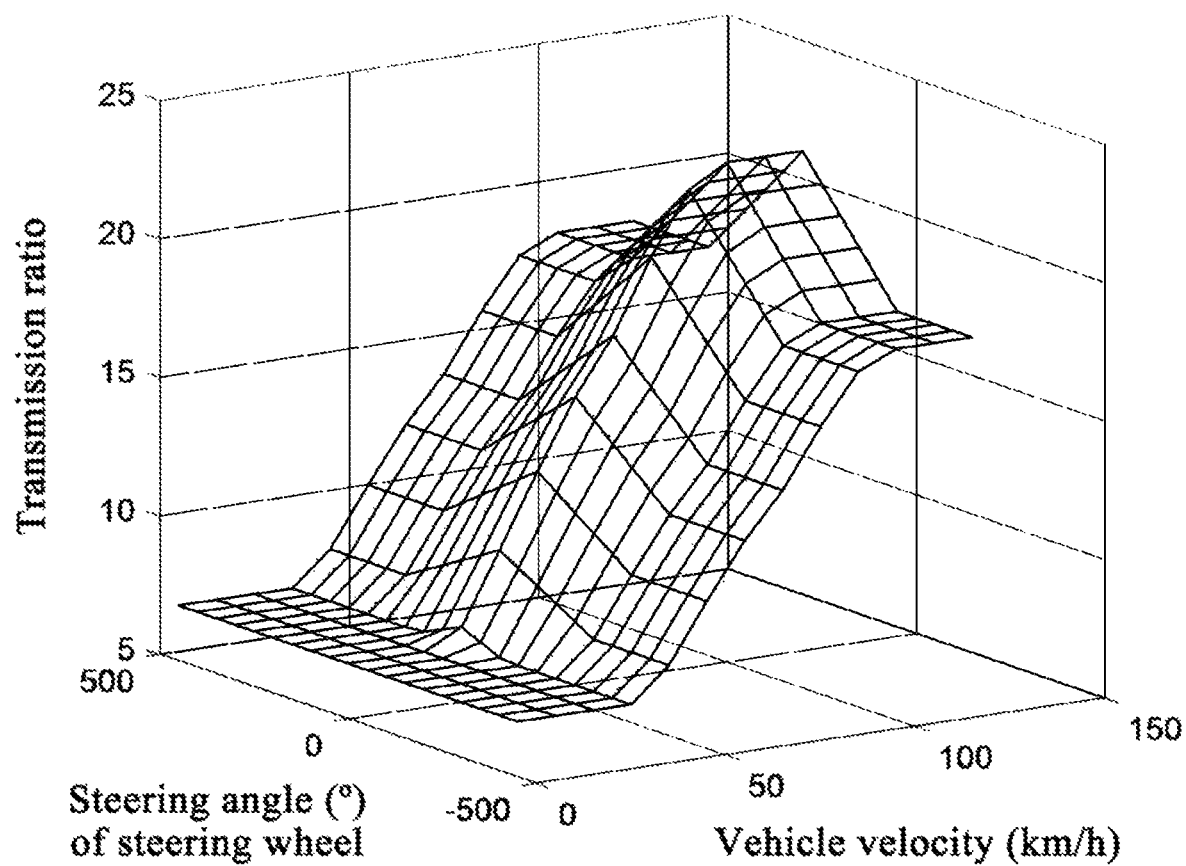
FIG. 10 is a MAP of ideal transmission ratio of the differential cooperative active steering system for the front-axle independent-drive vehicle with electric wheels according to an embodiment of the present disclosure.

(1) A MAP of ideal transmission ratio of the AFS system, i.e., a diagram showing the relationship between the ideal transmission ratio and a vehicle velocity and a steering angle of the steering wheel. FIG. 10 shows an embodiment of the MAP of ideal transmission ratio.

Figure 11:
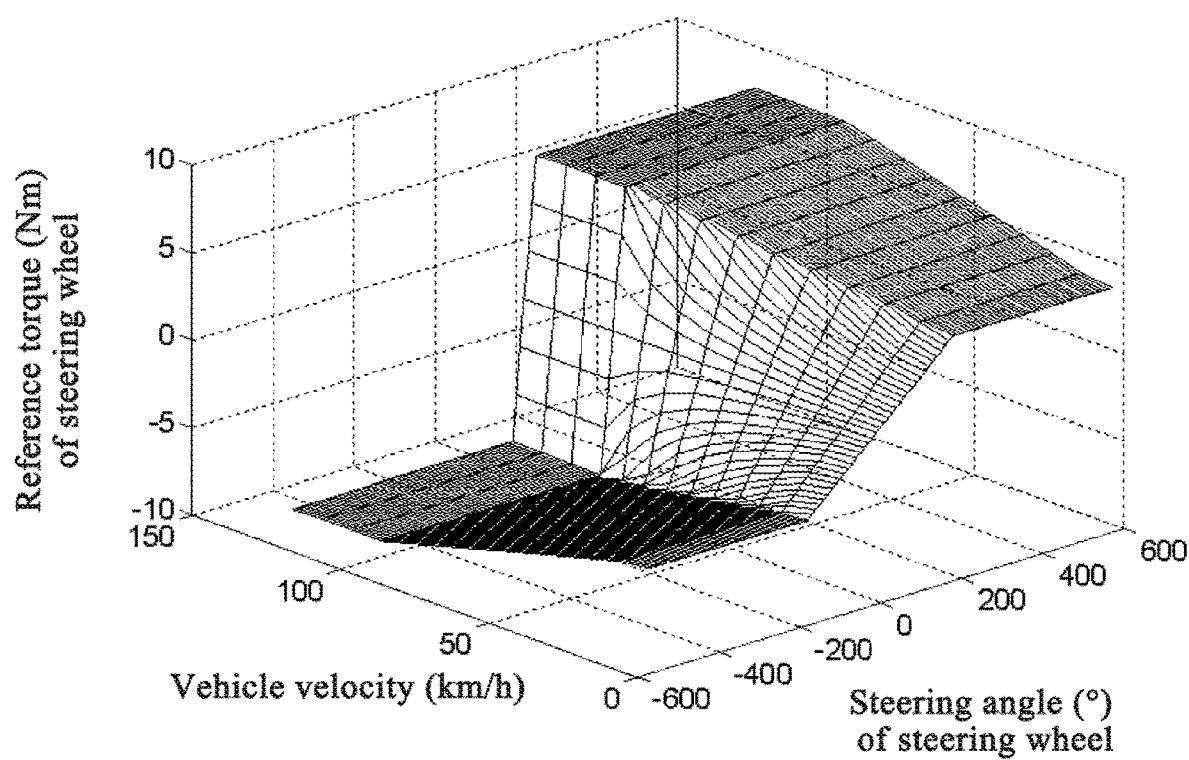
FIG. 11 is a MAP of reference steering wheel torque of the differential cooperative active steering system for the front-axle independent-drive vehicle with electric wheels according to an embodiment of the present disclosure.

(2) A MAP of reference steering wheel torque, i.e., a diagram showing the relationship between the reference steering torque of the steering wheel and the vehicle velocity and the steering angle of the steering wheel. FIG. 11 shows an embodiment of the MAP of reference steering wheel torque.

(3) Control thresholds: a slip rate threshold $s_0$, a steering angle threshold $\delta_{h0}$ of the steering wheel, an assist threshold $T_{h0}$, and a time threshold $i_0$.

S200: The steering and drive integrated controller reads signals of sensors, mainly including: a steering angle $\delta_h$ of the steering wheel, a torque $T_h$, steering velocities $n_i$ and $n_o$ of inner and outer drive wheels, the vehicle velocity V and the yaw rate $\omega_r$ obtained from the CAN bus, and the torques $T_i$ and $T_o$ of hub motors of the inner and outer driving wheels. The analog signals (the steering angle $\delta_h$ and the torque $T_h$ of the steering wheel) measured by the sensors are filtered.

S300: Whether the steering angle $\delta_h$ of the steering wheel exceeds the steering angle threshold $\delta_{h0}$ is determined. If $\delta_h \leq \delta_{h0}$, it is indicated that the steering wheel oscillates slightly around a center position, and the vehicle runs straightly, then return to S200 to re-read signals of the sensors. If $\delta_h > \delta_{h0}$, proceed to S400.

S400: A mode determination sub-process is called to determine whether the vehicle is currently in a steering state or a return-to-center state.

S500: If flag=0, the vehicle is in the steering state; and then call S510: a steering control flow of an AFS subsystem, S520: a steering control flow of a DDAS subsystem, and S550: a torque distribution sub-process. If flag=1, the vehicle is in the return-to-center state; and then call S530: a returning control flow of the AFS subsystem, S540: a returning control flow of the DDAS subsystem, and S550: the torque distribution sub-process.

S600: Control signals $\delta_{ac}$, $T_i$ and $T_o$ calculated by calling the sub-control processes are sent to the controller of the steering angle coupling motor and the first hub motor controller, and the second hub motor controller, respectively.

Figure 4:
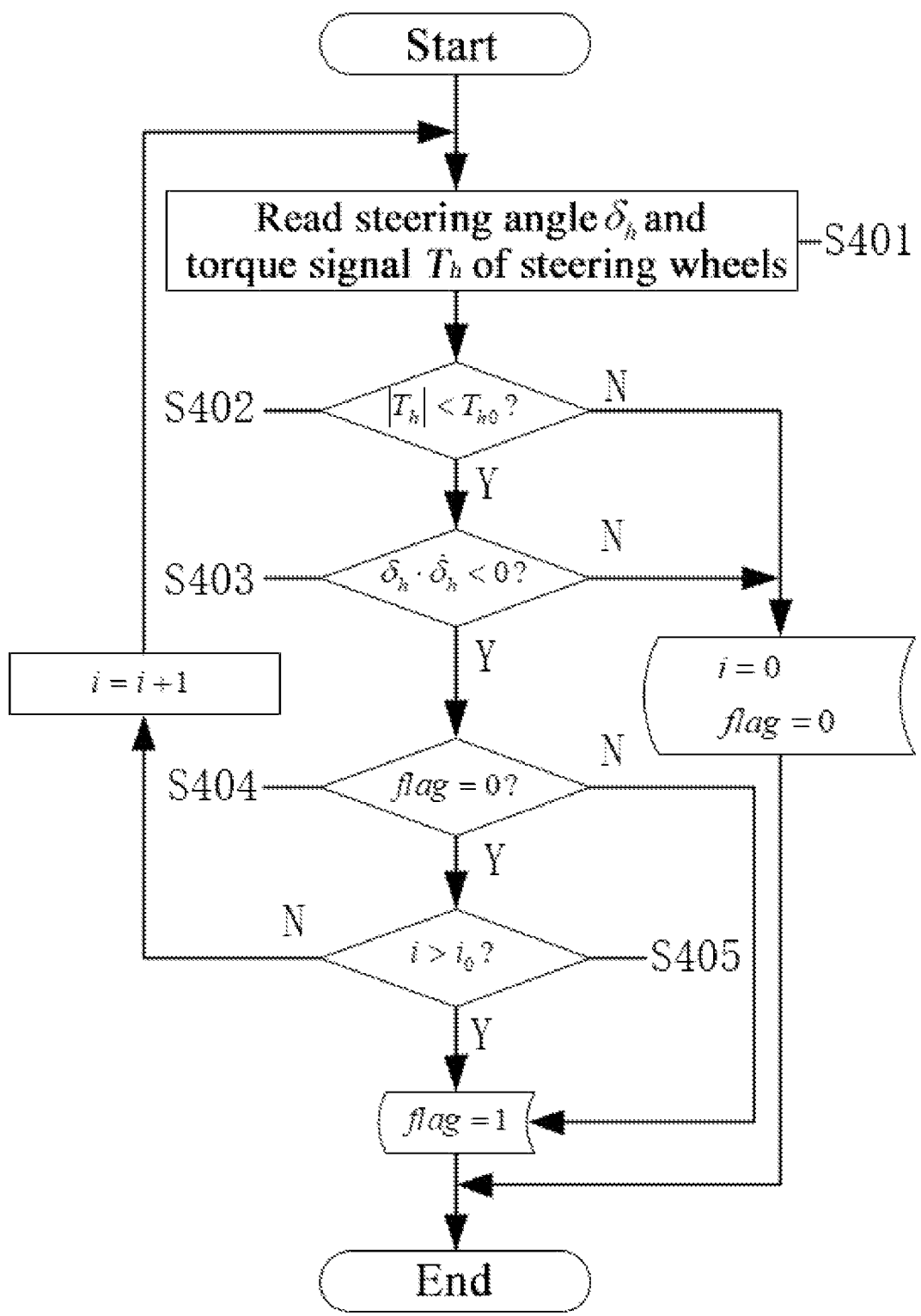
FIG. 4 is a sub-flow chart of a mode determination of the differential cooperative active steering system for an front-axle independent-drive vehicle with electric wheels according to an embodiment of the present disclosure.

As shown in FIG. 4, provided is a sub-flow chart of a mode determination, i.e., a determination process of an active return sign, including the following steps.

S401: The steering angle $\delta_h$ and the torque $T_h$ of the steering wheel are read.

S402: Whether the torque $T_h$ of the steering wheel is less than the assist threshold $T_{h0}$ is determined. If $|T_h|<T_{h0}$, proceed to S403; otherwise, set i to 0, and output flag=0.

S403: Whether a product of the steering angle $\delta_h$ of the steering wheel and an angular velocity $\dot{\delta}_h$ of the steering wheel is less than 0 is determined. If $\delta_h \cdot \dot{\delta}_h < 0$, proceed to S404; otherwise, set i to 0, and output flag=0.

S404: Whether the active return sign flag is 0 is determined. If flag=0, the active return control has not been activated, then start timing, and then proceed to S405; otherwise, output flag=1.

S405: Whether time i is greater than the time threshold $i_0$. If $i > i_0$, output flag=1; otherwise, set i=i+1, and return to S401.

Figure 5:
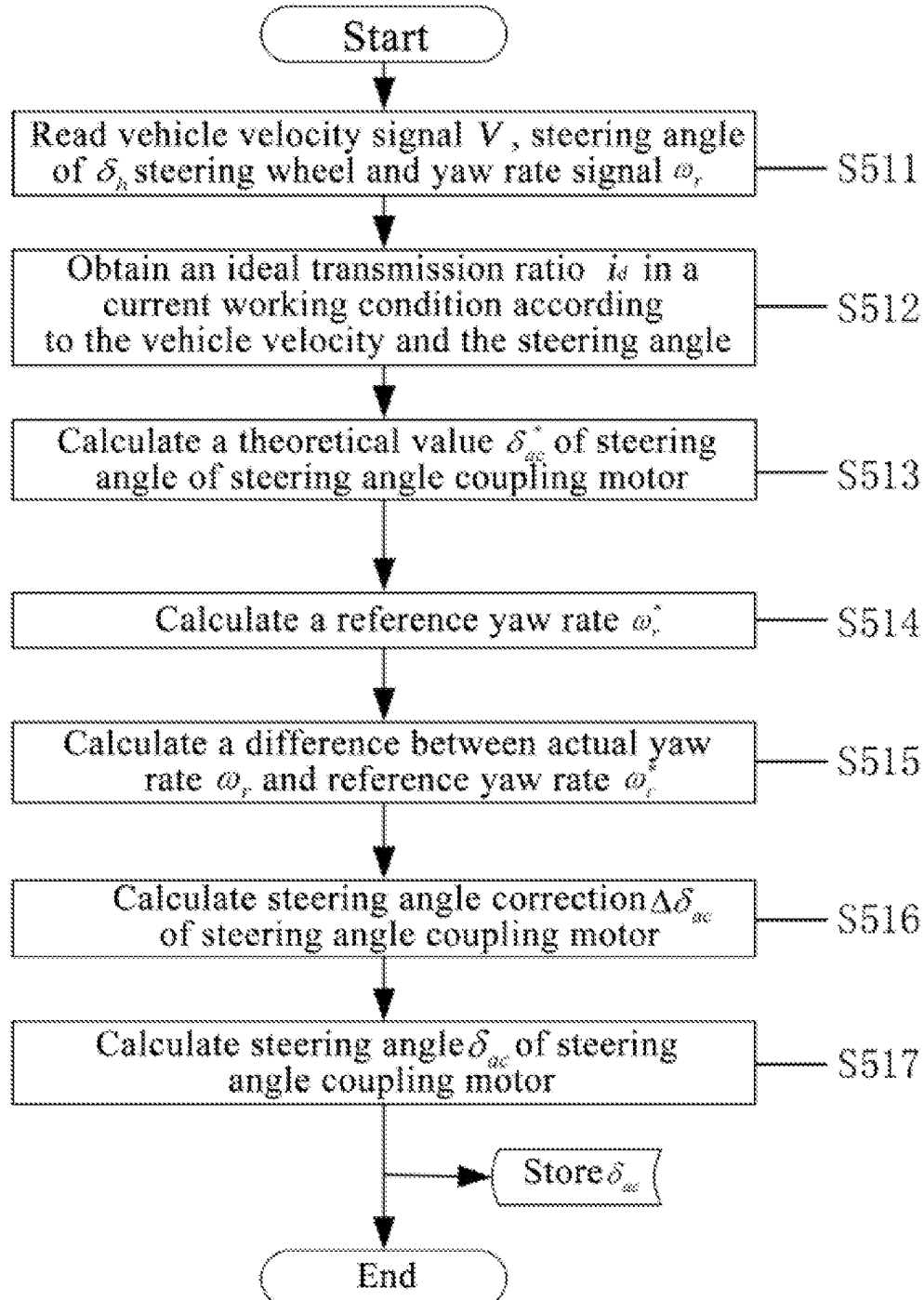
FIG. 5 is a control flow chart of an AFS subsystem when the differential cooperative active steering system for the front-axle independent-drive vehicle with electric wheels is in a steering state according to an embodiment of the present disclosure.

As shown in FIG. 5, in this embodiment, the step of calculating an output steering angle of a steering angle coupling motor when the vehicle is in the steering state a calculation process of the output steering angle of the steering angle coupling motor in step 2 comprises:

S511: The vehicle velocity V, the steering angle $\delta_h$ of the steering wheel and the yaw rate $\omega_r$ are collected.

S512: An ideal transmission ratio $i_d$ in the current working condition is obtained by reading the MAP of ideal transmission ratio of the AFS system based on the vehicle velocity V and the steering angle $\delta_h$ of the steering wheel.

S513: A theoretical value of a steering angle of the steering angle coupling motor is calculated:

$$\delta_{ac}^* = \left(1 - \frac{i_{13}^H \cdot i_{ws}}{i_d}\right) \frac{i_M}{1 - i_{13}^H} \cdot \delta_h;$$

where $i_{13}^H$ is a transmission ratio from the input end to the output end when the planetary frame of the planetary gear mechanism is fixed; $i_{ws}$ is a transmission ratio of the steering gear; $i_M$ is a transmission ratio of a reduction mechanism of the steering angle coupling motor.

S514: A reference yaw rate $$\omega_r^* = \frac{V}{L} \cdot \frac{\delta_h}{i_d}$$

is calculated, where L is a wheelbase of the vehicle.

S515: A difference between the actual yaw rate $\omega_r$ and the reference yaw rate $\omega_r^*$ is calculated: $e_\omega = \omega_r - \omega_r^*$.

S516: A steering angle correction $\Delta\delta_{ac}$ of the steering angle coupling motor is calculated through a PID controller based on $e_\omega$. When the DDAS system achieves a steering assistance through a drive torque difference between both sides of the front axle, an additional yaw moment $M_{zd}$ around the vehicle center of mass is introduced, which will change the steady-state yaw rate gain of the vehicle, i.e., the yaw rate gain of the steering angle of the steering wheel determined by the ideal steering wheel angle transmission ratio, obtained from the MAP based on the vehicle velocity and the steering angle of the steering wheel, further affecting the dynamic characteristics of the steering system. Therefore, the method of the present disclosure makes the steering process of the vehicle closer to the ideal steering characteristic through a feedback control of the yaw rate.

S517: The steering angle of the steering angle coupling motor is calculated as follows:

$$\delta_{ac} = \delta_{ac}^* + \Delta\delta_{ac}.$$

Figure 6:
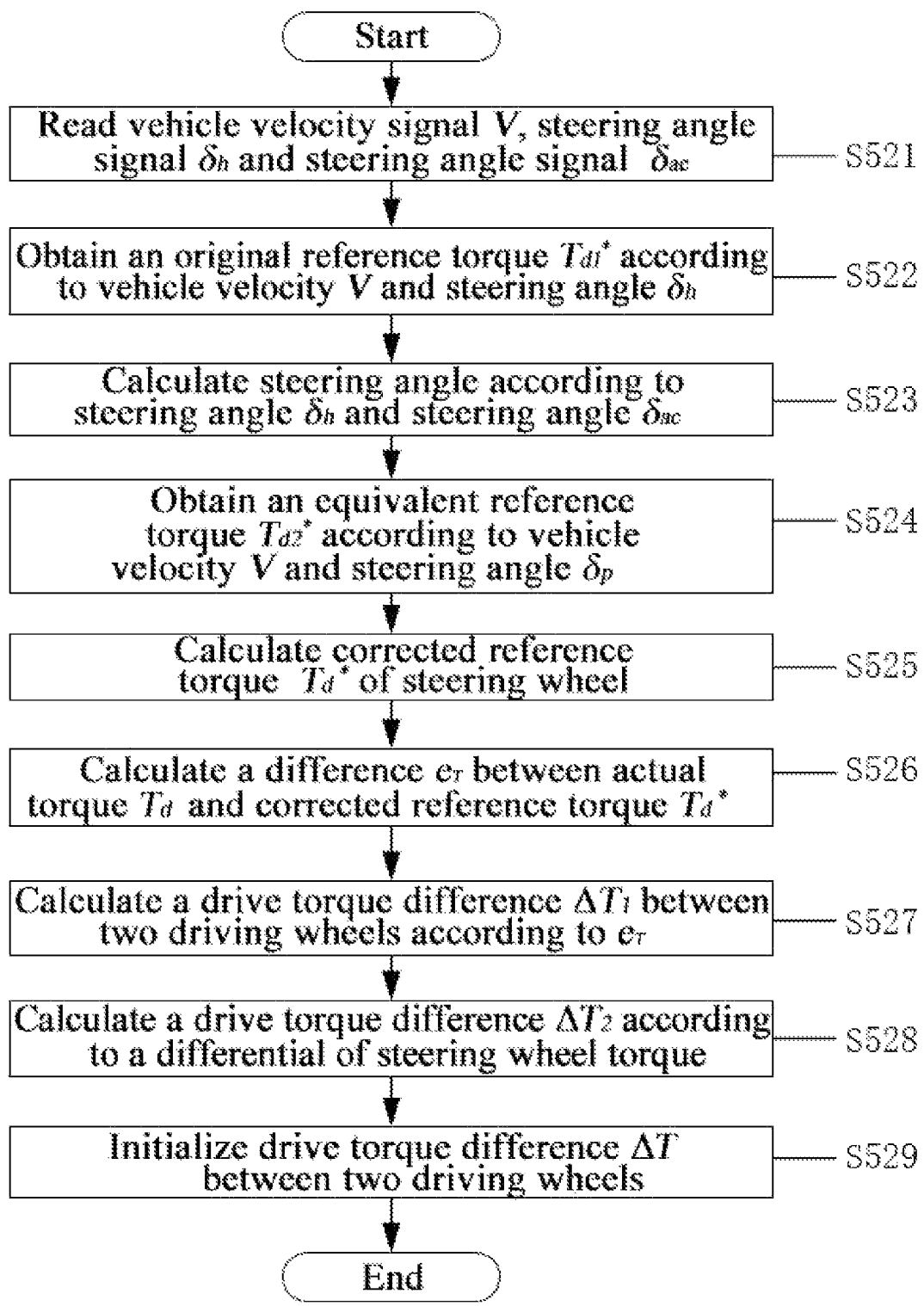
FIG. 6 is a control flow chart of a DDAS subsystem when the differential cooperative active steering system for the front-axle independent-drive vehicle with electric wheels is in the steering state according to an embodiment of the present disclosure.

As shown in FIG. 6, provided is a control flow chart of a DDAS subsystem during steering in the embodiment, including the following steps.

S521: The velocity signal V of the vehicle, the steering angle signal $\delta_h$ of the steering wheel and the steering angle signal $\delta_{aa}$ of t coupling motor are collected.

S522: The original reference torque $T_{d1}^*$ of the steering wheel is obtained according to the MAP of reference torque of the steering wheel based on the velocity V of the vehicle and the steering angle $\delta_h$ of the steering wheel.

S523: The steering angle of the pinion is calculated according to the steering angle $\delta_h$ of the steering wheel and the steering angle $\delta_{ac}$ of the steering angle coupling motor as follows:

$$\delta_p = \frac{1}{i_{13}^H} \cdot \delta_h + \left(1 - \frac{1}{i_{13}^H}\right) \frac{1}{i_M} \cdot \delta_{ac}.$$

S524: An equivalent reference torque $T_{d2}^*$ of the steering wheel is obtained according to the MAP of reference torque of the steering wheel based on the velocity V of the vehicle and the steering angle $\delta_p$.

S525: The corrected reference torque of the steering wheel is calculated as follows:

$$T_d^* = T_{d1}^* + k_1(T_{d2}^* - T_{d1}^*);$$

where $k_1$ is a perception coefficient. The reason for the correction of the reference steering wheel torque is described as follows: the additional steering angle intervention imposed by the AFS system will change the steering angle of the front wheels of the vehicle, which will result in a change in the aligning torque. Since the intervention of the AFS system does not change the steering angle of the steering wheel, the reference torque of the steering wheel obtained from the MAP will not change. Therefore, the driver's hand force will not change when the system reaches a steady state, which is indicated that the driver cannot correctly perceive the road surface information and the driving state of the vehicle. The equivalent reference torque $T_{d2}^*$, of the steering wheel obtained by the MAP according to the velocity V of the vehicle and the steering angle $\delta_p$ of the steering wheel can faithfully reflect the current driving state of the vehicle. However, when the torque $T_{d2}^*$, of the steering wheel is directly used as a reference, excessive fluctuations will be caused in the steering wheel torque, which is likely to cause misoperation by the driver, and not conducive to safe driving. Therefore, $k_1(T_{d2}^* - T_{d1}^*)$ is taken as the correction of the original reference torque $T_{d1}^*$, of the steering wheel, which is also an amount of torque change that the driver actually perceives.

S526: A difference between the actual torque $T_d$ of the steering wheel and the corrected reference torque $T_d^*$ of the steering wheel are calculated as follows:

$$e_T = T_d - T_d^*.$$

S527: The drive torque difference $\Delta T_1$ between the two driving wheels is calculated according to $e_T$ through the PID controller.

S528: The drive torque difference $\Delta T_2$ is calculated according to a differential of the steering wheel torque $T_d$. The additional steering angle intervention imposed by the AFS system will cause a change in the aligning torque, resulting in instantaneous fluctuations in the steering wheel torque. In addition, vibrations may easily be caused in severe cases, affecting normal driving. Therefore, the present disclosure obtains the drive torque difference $\Delta T_2$ through the control module of the steering wheel torque differential, to suppress the drastic change of the steering wheel torque.

S529: The drive torque difference between the two driving wheels is initialized as follows: $\Delta T=\Delta T_1+\Delta T_2$.

Figure 7:
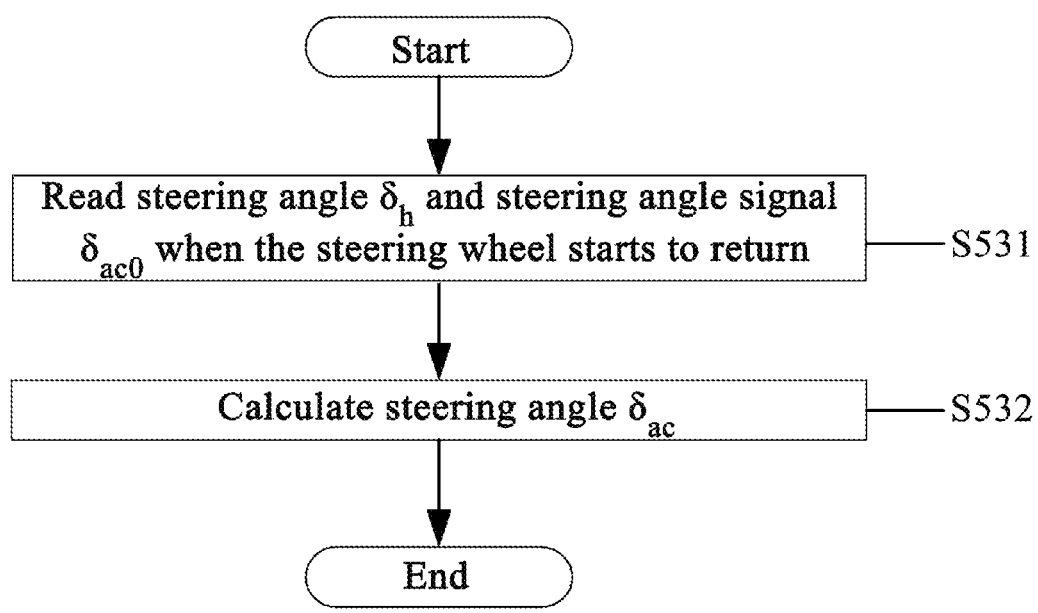
FIG. 7 is a control flow chart of the AFS subsystem when the differential cooperative active steering system for the front-axle independent-drive vehicle with electric wheels is in a return-to-center state according to an embodiment of the present disclosure.

As shown in FIG. 7, provided is a control flow chart of the AFS subsystem during returning, including the following steps.

S531: The steering angle $\delta_h$ of the steering wheel and the steering angle signal $\delta_{ac0}$ of the steering wheel are obtained when the vehicle starts to return to center.

S532: The steering angle of the steering angle coupling motor is calculated as follows:

$$\delta_{ac} = \delta_{ac0} - \int \frac{\delta_{ac}}{\delta_h} \cdot \delta_h dt.$$

Figure 8:
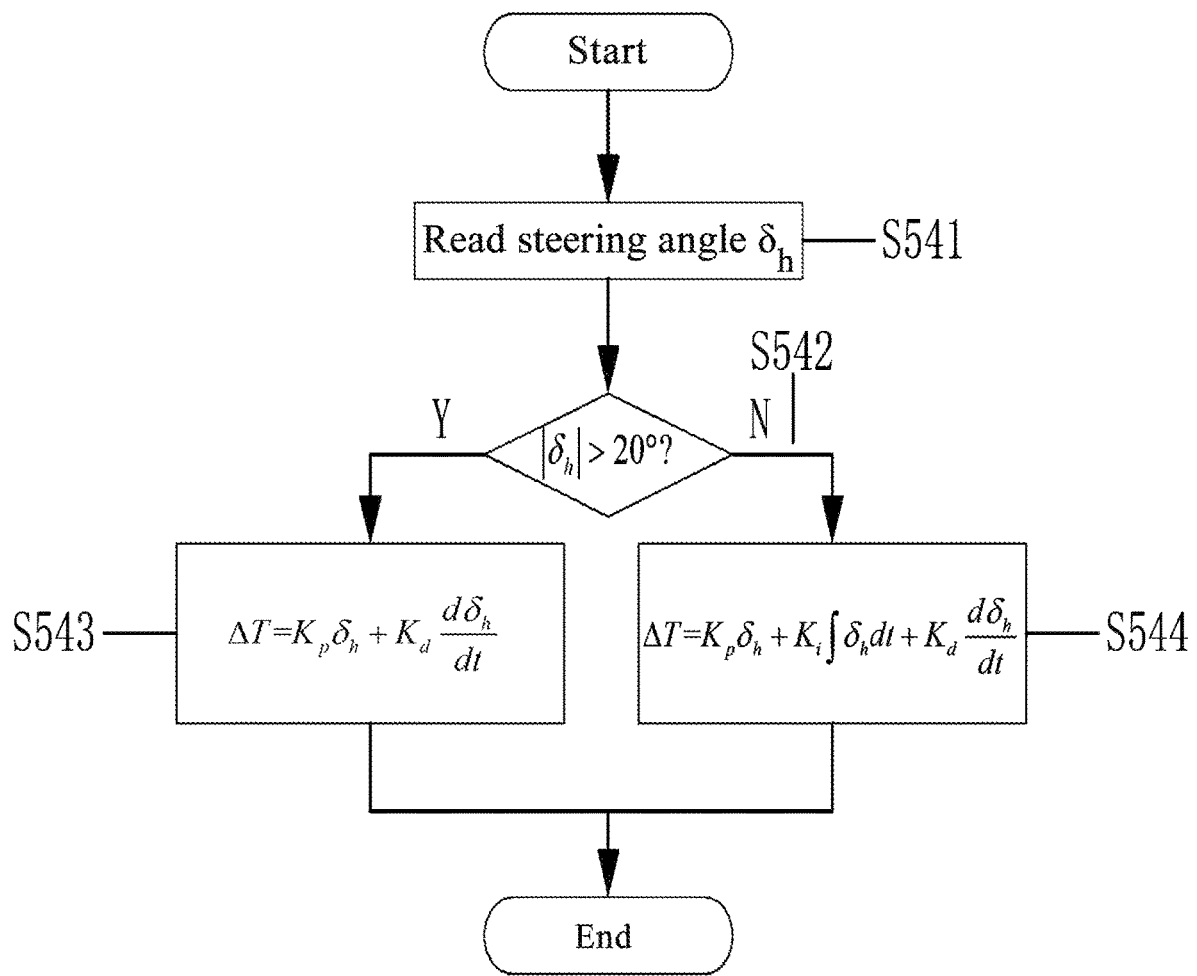
FIG. 8 is a control flow chart of the DDAS subsystem when the differential cooperative active steering system for the front-axle independent-drive vehicle with electric wheels is in the return-to-center state according to an embodiment of the present disclosure.

As shown in FIG. 8, provided is a control flow chart of the DDAS subsystem during returning, including the following steps.

S541: The steering angle $\delta_h$ of the steering wheel is calculated.

S542: Whether the steering angle of the steering wheel is greater than 20° is determined. If $|\delta_h|>20°$, proceed to S543; otherwise, proceed to S544.

S543: The drive torque difference between the two driving wheels is calculated as follows:

$$\Delta T = K_p \delta_h + K_d \frac{d\delta_h}{dt}.$$

S544: The drive torque difference between the two driving wheels is calculated as follows:

$$\Delta T = K_p \delta_h + K_i \int \delta_h dt + K_d \frac{d\delta_h}{dt};$$

where $K_p$, $K_i$, $K_d$ are respectively a proportional coefficient, an integral coefficient and a differential coefficient of the PID controller.

Figure 9:
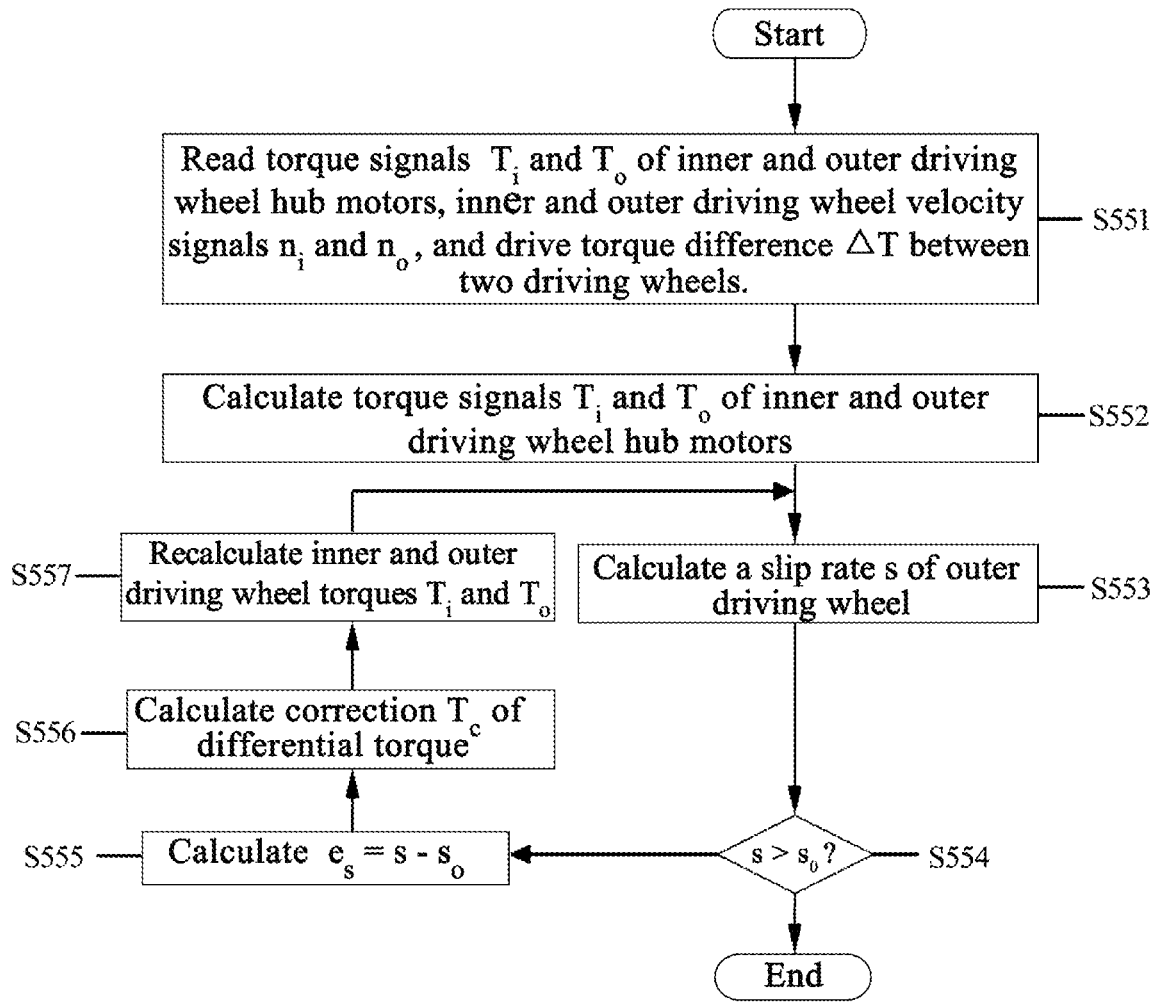
FIG. 9 is a sub-flow chart of torque distribution of the differential cooperative active steering system for the front-axle independent-drive vehicle with electric wheels according to an embodiment of the present disclosure.

As shown in FIG. 9, provided is a torque distribution sub-flow chart, including the following steps.

S551: The velocity signal V of the vehicle, the torque signal $T_i$ of the hub motor of the inner driving wheel and the torque signal $T_o$ of the hub motor of the outer driving wheel, the velocity signal $n_i$ of the inner driving wheel and the velocity signal $n_o$ of the outer driving wheel, and the drive torque difference $\Delta T$ between the two driving wheels are obtained.

S552: The torques of the hub motors of the inner and outer driving wheel are calculated, where the inner drive torque is $T_i=\frac{1}{2}(T_{dri}-\Delta T)$; and the outer drive torque is $T_o=\frac{1}{2}(T_{dri}+\Delta T)$, where $T_{dri}$ is the total drive torque.

S553: The slip rate of the outer driving wheel is calculated as follows:

$$s = \frac{r\omega - u_w}{r\omega};$$

where $u_w$ is the velocity of the wheel center; r is the wheel rolling radius; and $\omega$ is the angular velocity of the wheel.

S554: Whether the slip rate s of the outer driving wheel exceeds the slip rate threshold $s_0$ of the outer driving wheel are determined, where $s_0$ is set according to the actual working conditions of the vehicle. In the embodiment, $s_0=0.25$. If $s>s_0$, it is indicated that the applied differential torque is too large, then proceed to S555; if $s\leq s_0$, it is indicated that the differential torque is appropriate, then output the torque $T_i$ of the inner driving wheel and torque $T_o$ of the outer driving wheel.

S555: A difference between the slip rate s of the outer driving wheel and the slip rate threshold $s_0$ is calculated as follows: $e_s=s-s_0$.

S556: The correction $T_c$ of the differential torque $\Delta T$ is calculated through the PID controller according to $e_s$.

S557: The torque of the inner driving wheel is recalculated as follows:

$T_i=T_i-T_c$, and the torque of the outer driving wheel is recalculated as follows: $T_o=T_o-T_c$, to maintain a same assisted differential torque, and return to S553.

The present disclosure provides a differential cooperative active steering system for a front-axle independent-drive vehicle with electric wheels, in which a planetary gear mechanism is provided to realize the coupling between an input steering angle of an input shaft of a steering wheel and an input steering angle of a steering angle coupling motor, thereby achieving an active steering of the vehicle; and two same independent wheel drive systems are provided to drive the vehicle and provide steering assistance, which further makes the steering system more portable and flexible.

The present disclosure further provides a method for controlling a differential cooperative active steering system for an front-axle independent-drive vehicle with electric wheels, in which an influence of the differential-drive-assist-steering function on the steering gain characteristics of the active steering system can be effectively suppressed by correcting original control strategies of the AFS system and the DDAS system, so that the vehicle can better maintain the ideal steering characteristics, and effectively weaken the momentary fluctuation of the steering wheel torque controlled by the differential-drive-assist-steering system caused by the intervention of the steering system, ensuring that the driver can perceive the correct road information.

Described above are only preferred embodiments of the present disclosure, and are not intended to limit the scope of the present disclosure. It should be understood that any improvement and modification made by those skilled in the art without departing from the spirit of the present disclosure shall fall within the scope of the disclosure defined by the appended claims.

What is claimed is:

1. A method for controlling a differential cooperative active steering system, comprising:

1) collecting, by a plurality of sensors, a steering angle of a steering wheel and a torque of the steering wheel, and determining, by a steering and drive integrated controller, a driving state of a vehicle according to the steering angle of the steering wheel and the torque of the steering wheel; wherein the driving state comprises a steering state, a return-to-center state and a straight-running state;

2) calculating, by the steering and drive integrated controller, an output steering angle of a steering angle coupling motor and a drive torque difference between an inner driving wheel and an outer driving wheel when the vehicle is in the steering state, and coupling, by a planetary gear mechanism, the steering angle of the steering wheel and the output steering angle of the steering angle coupling motor to output a steering angle of a pinion; and calculating, by the steering and drive integrated controller, the output steering angle of the steering angle coupling motor and the drive torque difference between the inner driving wheel and the outer driving wheel when the vehicle is in the return-to-center state;

3) sending, from the steering and drive integrated controller, the output steering angle of the steering angle coupling motor to a controller of the steering angle coupling motor; and sending, from the steering and drive integrated controller, a torque of a first hub motor of the inner driving wheel and a torque of a second hub motor of the outer driving wheel to a first hub motor controllers and a second hub motor controller, respectively; and 4) controlling, by the steering and drive integrated controller, an active steering of the vehicle via the steering angle coupling motor, based on the steering angle of the pinion; and controlling, by the steering and drive integrated controller, a differential drive assisted steering of the vehicle via the first hub motor and the second hub motor, based on the torque of the first hub motor and the torque of the second hub motor;

wherein, the step of determining a driving state of the vehicle according to the steering angle and the torque in step 1) comprises:

comparing the torque of the steering wheel with an assist threshold, and calculating a product of the steering angle and an angular velocity of the steering wheel;

if the torque of the steering wheel is not less than the assist threshold or the product of the torque of the steering wheel and the assist threshold is not negative, setting a time value to 0, and determining that the vehicle is in the steering state;

if the torque of the steering wheel is not less than the assist threshold and the product of the torque of the steering wheel and the assist threshold is negative, starting timing and comparing the time value with a time threshold value; if the time value is greater than the time threshold value, determining that the vehicle is in the return-to-center state;

the step of calculating an output steering angle of a steering angle coupling motor when the vehicle is in the steering state in step 2) comprises:

a) collecting a vehicle velocity, the steering angle of the steering wheel and a yaw rate, and based on the vehicle velocity and the steering angle of the steering wheel, obtaining an ideal transmission ratio under a current working condition by reading a MAP of ideal transmission ratio;

b) calculating a theoretical value of the steering angle of the steering angle coupling motor according to the ideal transmission ratio and the steering angle of the steering wheel, wherein the calculation formula is:

$$\delta_{ac}^* = \left(1 - \frac{i_{13}^H \cdot i_{ws}}{i_d}\right)\frac{i_M}{1 - i_{13}^H} \cdot \delta_h;$$

wherein $\delta_{ac}^*$ is the theoretical value of the steering angle of the steering angle coupling motor; $i_{13}^H$ is a transmission ratio from an input end of the planetary gear mechanism to an output end of the planetary gear mechanism when a planetary frame of the planetary gear mechanism is fixed; $i_{ws}$ is a transmission ratio of a steering gear; $i_M$ is a transmission ratio of a reduction mechanism of the steering angle coupling motor; $i_d$ is the ideal transmission ratio; and $\delta_h$ is the steering angle of the steering wheel;

c) calculating a difference between an actual yaw rate and a reference yaw rate as follows:

$$e_\omega = \omega_r - \omega_r^*;$$

wherein $e_\omega$ is the difference between the actual yaw rate and the reference yaw rate; $\omega_r$ is the actual yaw rate; $\omega_r^*$ is the reference yaw rate;

$$\omega_r^* = \frac{V}{L} \cdot \frac{\delta_h}{i_d};$$

V is a velocity of the vehicle; L is a wheelbase of the vehicle; $\delta_h$ is the steering angle of the steering wheel; and $i_d$ is the ideal transmission ratio;

d) calculating a steering angle correction $\Delta\delta_{ac}$ of the steering angle coupling motor by inputting the difference between the actual yaw rate and the reference yaw rate into a proportional-integral-derivative (PID) controller; and e) calculating the output steering angle of the steering angle coupling motor as follows:

$$\delta_{ac} = \delta_{ac}^* + \Delta\delta_{ac};$$

wherein $\delta_{ac}$ is the output steering angle of the steering angle coupling motor; $\delta_{ac}^*$ is the theoretical value of the steering angle of the steering angle coupling motor; $\Delta\delta_{ac}$ is the steering angle correction of the steering angle coupling motor.

2. The method of claim 1, wherein the step of calculating the drive torque difference between the inner driving wheel and the outer driving wheel when the vehicle is in the steering state in step 2) comprises:

2.1) calculating the steering angle of the pinion according to the steering angle of the steering wheel and the steering angle of the steering angle coupling motor:

$$\delta_p = \frac{1}{i_{13}^H} \cdot \delta_h + \left(1 - \frac{1}{i_{13}^H}\right)\frac{1}{i_M} \cdot \delta_{ac};$$

wherein $\delta_p$ is the steering angle of the pinion; $\delta_h$ is the steering angle of the steering wheel; $i_{13}^H$ is the transmission ratio from the input end to the output end when the planetary frame of the planetary gear mechanism is fixed; $i_M$ is the transmission ratio of the reduction mechanism of the steering angle coupling motor; and $\delta_{ac}$ is the steering angle of the steering angle coupling motor.

2.2) calculating a corrected reference torque of the steering wheel:

$$T_d^* = T_{d1}^* + k_1(T_{d2}^* - T_{d1}^*);$$

wherein $T_d^*$ is the corrected reference torque of the steering wheel; $T_{d1}^*$ is an original reference torque of the steering wheel and is obtained by reading a MAP of the torque of the steering wheel according to the vehicle velocity and the steering angle of the steering wheel; $k_1$ is a perception coefficient; $T_{d2}^*$ is an equivalent reference torque of the steering wheel and is obtained by reading the MAP of the torque of the steering wheel according to the velocity of the vehicle and the steering angle of the pinion;

2.3) calculating a difference between the actual torque of the steering wheel and the corrected reference torque of the steering wheel as follows:

$e_T = T_d - T_d^*$;

wherein $e_T$ is the difference between the actual torque of the steering wheel and the corrected reference torque of the steering wheel; $T_d$ is the actual torque of the steering wheel; $T_d^*$ is the corrected reference torque of the steering wheel;

2.4) calculating a corrected drive torque difference $\Delta T_1$ wheels between the inner driving wheel and the outer driving wheel by inputting the difference between the actual torque of the steering wheel and the corrected reference torque of the steering wheel into the PID controller, and calculating a drive torque difference $\Delta T_2$ between the inner driving wheel and the outer driving wheel according to a differential of the torque of the steering wheel; and 2.5) calculating the drive torque difference between the inner driving wheel and the outer driving wheel when the vehicle is in the steering state:

$\Delta T = \Delta T_1 + \Delta T_2$;

wherein $\Delta T$ is the drive torque difference when the vehicle is in the steering state.

3. The method of claim 2, the step of calculating the output steering angle of the steering angle coupling motor when the vehicle is in the return-to-center state in step 2) comprises:

obtaining the steering angle of the steering wheel and the steering angle of the steering angle coupling motor; and calculating the steering angle of the steering angle coupling motor when the vehicle is in the return-to-center state:

$$\delta_{ac}^h = \delta_{ac0} - \int \frac{\delta_{ac}}{\delta_h} \cdot \delta_h dt;$$

wherein $\delta_{ac}^h$ is the steering angle of the steering angle coupling motor when the vehicle is in the return-to-center state; $\delta_{ac0}$ is the steering angle of the steering angle coupling motor when the vehicle starts to return; $\delta_h$ is the steering angle of the steering wheel.

4. The method of claim 2, wherein the drive torque difference between the inner driving wheel and the outer driving wheel when the vehicle is in the return-to-center state in step 2) is:

$$\Delta T^H = \begin{cases} K_p \delta_h + K_d \frac{d\delta_h}{dt} & |\delta_h| > 20° \\ K_p \delta_h + K_i \int \delta_h dt + K_d \frac{d\delta_h}{dt} & |\delta_h| \leq 20° \end{cases};$$

wherein $\Delta T^H$ is the drive torque difference between the inner driving wheel and the outer driving wheel when the vehicle is in the return-to-center state; $\delta_h$ is the steering angle of the steering wheel; $K_p, K_i, K_d$ are respectively a proportional coefficient, an integral coefficient and a derivative coefficient of the PID controller.

5. The method of claim 3, wherein the drive torque difference between the inner driving wheel and the outer driving wheel when the vehicle is in the return-to-center state in step 2) is:

$$\Delta T^H = \begin{cases} K_p \delta_h + K_d \frac{d\delta_h}{dt} & |\delta_h| > 20° \\ K_p \delta_h + K_i \int \delta_h dt + K_d \frac{d\delta_h}{dt} & |\delta_h| \leq 20° \end{cases};$$

wherein $\Delta T^H$ is the drive torque difference between the inner driving wheel and the outer driving wheel when the vehicle is in the return-to-center state; $\delta_h$ is the steering angle of the steering wheel; $K_p, K_i, K_d$ are respectively a proportional coefficient, an integral coefficient and a derivative coefficient of the PID controller.

6. The method of claim 4, wherein step 3) comprises:

calculating the torque of the first hub motor of the inner driving wheel and the torque of the second hub motor of the outer driving wheel:

$T_i = \frac{1}{2}(T_{dri} - \Delta T)$;

$T_o = \frac{1}{2}(T_{dri} + \Delta T)$;

wherein $T_i$ is the torque of the first hub motor of the inner driving wheel; $T_o$ is the torque of the second hub motor of the outer driving wheel; $T_{dri}$ is a total drive torque; and $\Delta T$ is the drive torque difference between the inner driving wheel and the outer driving wheel when the vehicle is in the steering state or return-to-center state;

calculating a slip rate of the outer driving wheel:

$$s = \frac{r\omega - u_w}{r\omega};$$

wherein $u_w$ is a velocity of a wheel center; $r$ is a rolling radius of a wheel; and $\omega$ is an angular velocity of the wheel;

comparing the slip rate of the outer driving wheel with a slip rate threshold of the outer driving wheel; if the slip rate of the outer driving wheel is not greater than the slip rate threshold of the outer driving wheel, outputting the torque of the first hub motor of the inner driving wheel and the torque of the second hub motor of the outer driving wheel to the first hub motor controller and the second hub motor controller;

if the slip rate of the outer driving wheel is greater than the slip rate threshold of the outer driving wheel, inputting a difference between the slip rate of the outer driving wheel and the slip rate threshold into the PID controller to obtain a correction $T_c$ of a differential torque;

recalculating the torque of the first hub motor of the inner driving wheel:

$T_i' = T_i - T_c$; and recalculating the torque of the second hub motor of the outer driving wheel:

$T_o' = T_o - T_c$;

wherein $T_i'$ is a recalculated torque of the first hub motor of the inner driving wheel; $T_o'$ is a recalculated torque of the first hub motor of the inner driving wheel; $T_i$ is the torque of the second hub motor of the outer driving wheel and $T_o$ is the torque of the second hub motor of the outer driving wheel; and recalculating the slip rate of the outer driving wheel; and
comparing the slip rate of the outer driving wheel with the slip rate threshold of the outer driving wheel; if the slip rate of the outer driving wheel is not greater than the slip rate threshold, outputting the recalculated torque of the first hub motor of the inner driving wheel and the recalculated torque of the second hub motor of the outer driving wheel to the first hub motor controller and the second hub motor controller.

\* \* \* \* \*